United States Patent [19]
Webber

[11] 4,187,749
[45] Feb. 12, 1980

[54] METHOD AND APPARATUS FOR LOADING AND UNLOADING WORKPIECES

[75] Inventor: Robert Webber, Saginaw, Mich.

[73] Assignee: Bay City Boring, Bay City, Mich.

[21] Appl. No.: 885,497

[22] Filed: Mar. 13, 1978

[51] Int. Cl.² .................... B23B 13/00; B25J 3/00
[52] U.S. Cl. .................... 82/2.7; 414/751; 414/591
[58] Field of Search .......... 82/2.5, 2.7, 2 D; 214/1 R, 1 B, 1 BB, 1 BC, 1 BD

[56] References Cited
U.S. PATENT DOCUMENTS

| | | | |
|---|---|---|---|
| 3,572,520 | 3/1971 | Evans et al. | 214/1 R |
| 3,651,958 | 3/1972 | Evans et al. | 214/1 BB |
| 3,658,190 | 4/1972 | Fournier | 214/1 BB |
| 3,766,617 | 10/1973 | Forster et al. | 214/1 BC X |
| 3,887,084 | 6/1975 | Gallo et al. | 214/1 BB |
| 3,954,164 | 5/1976 | Bottomley | 214/1 BD X |
| 3,966,058 | 6/1976 | Heffron et al. | 214/1 BB |
| 4,061,062 | 12/1977 | Peltier | 82/2.7 |
| 4,082,018 | 4/1978 | Russell et al. | 82/2.5 |

*Primary Examiner*—Harrison L. Hinson

[57] ABSTRACT

Apparatus for loading and unloading a machine, such as a vertical spindle boring machine, comprising a transfer carriage, translatable in a forward and reverse path, mounting a turntable for movement therewith and for rotating movement relative thereto. The turntable includes a chuck for transferring at least one unmachined workpiece from a supply-discharge conveyor to a machine tool and another chuck for removing a machined workpiece from the machine tool and depositing the unmachined workpiece on the supply discharge conveyor.

15 Claims, 15 Drawing Figures

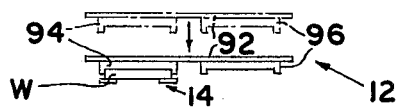
FIG.7
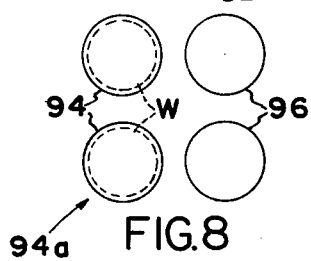
FIG.8
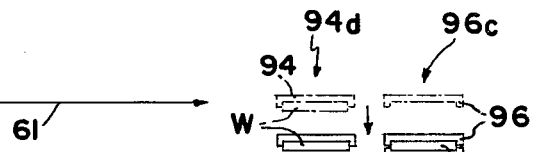
FIG.9
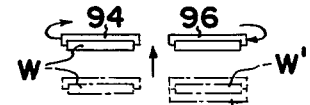
FIG.10
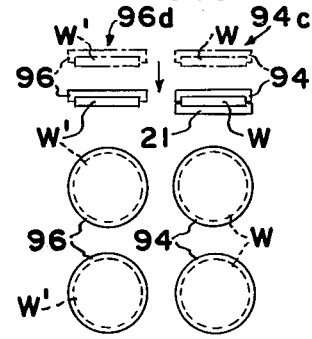
FIG.11
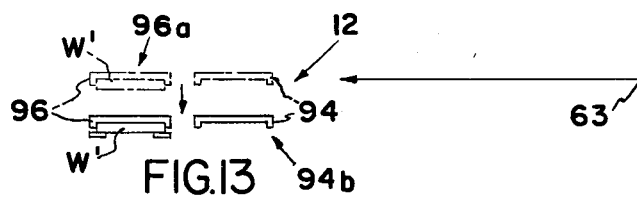
FIG.13     FIG.12
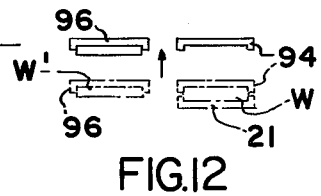
FIG.14
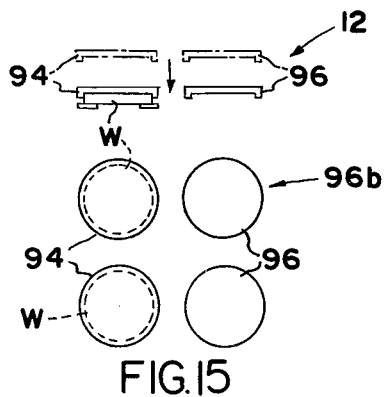
FIG.15

METHOD AND APPARATUS FOR LOADING AND UNLOADING WORKPIECES

BACKGROUND OF THE INVENTION

This invention relates to method and apparatus for loading and unloading a machine tool, such as a vertical spindle boring machine, and more particularly to apparatus for transferring unmachined workpieces from a common supply-discharge station to a machine tool and transfering machined workpieces from the machine tool to the common supply-discharge station.

Prior art apparatus for loading unmachined workpieces to a vertical spindle machine and for unloading machined workpieces from the machine has included an unmachined workpiece supply conveyor which is positioned in generally abutting relation with one side of the machine, and a machined workpiece discharge conveyor which is adjacent, and generally abutting, the opposite side of the machine. The prior art loading and unloading apparatus is positioned in front of the machine and includes a set of laterally movable loaders for moving the unmachined workpieces from a supply conveyor to the machine tool chucks and another set of unloaders for removing the finished workpieces from the spindles or chucks and transferring them to a discharge conveyor. The dual loader and unloader head system is relatively complicated and includes substantial lost motion. Moreover, when the machine tool becomes inoperative and requires repair or general maintenance, it is necessary to firstly remove the prior art loader to provide access to the machine tool. Such prior art loaders generally require special design to accommodate different machine tools. Such loading and unloading apparatus also dictates that the loader-unloader system be disposed between adjacent machines of a multi-machine system, which requires substantial floor space. In the prior art system, if the loader-unloader apparatus requires maintenance, it is generally necessary to interrupt operation of the load-unload machine during the maintenance period.

Accordingly, it is an object of the present invention to provide a method and apparatus for loading workpieces to and unloading workpieces from a machine tool which provides access for the operator to the front of the machine for maintenance and repair and manual loading and unloading, without the necessity of repositioning the loader-unloader.

Another object of the present invention is to provide loader-unloader apparatus of the type described which will permit maintenance and repair of the loader-unloader while permitting the machine tool to be manually loaded and without interrupting operation of the machine tool.

Another object of the present invention is to provide loader-unloader apparatus which can be quickly and easily adapted for use with a plurality of different machine tools.

Still another object of the present invention is to provide method and apparatus for loading unmachined workpieces from a load-unload station of a remotely located common supply-discharge conveyor to a machine tool and for unloading machined workpieces from the machine tool to the load-unload station of the supply-discharge conveyor.

Still another object of the present invention is to provide loader-unloader apparatus of the type described for loading a plurality of machine tools positioned in generally abutting side by side relation.

Yet another object of the present invention is to provide method and apparatus of the type described which rapidly loads and unloads.

A further object of the present invention is to provide workpiece loading and unloading apparatus which will minimize the vibration imparted to the machine tool by the loader-unloader apparatus.

A further object of the present invention is to provide method and apparatus for loading and unloading of the type described which will permit gauging of the machined workpieces remote from the machining operation.

Other objects and advantages of the present invention will become apparent to those of ordinary skill in the art as the description thereof proceeds.

SUMMARY OF THE INVENTION

Loading and unloading apparatus for loading and unloading a machine tool comprising a frame, a supply-discharge conveyor for supplying unmachined workpieces to a load-unload station, and for receiving machined workpieces from the load-unload station; transfer apparatus for removing an unmachined workpiece from the load-unload station on the conveyor to a first retracted position and then forwardly transferring the unmachined workpiece to a first advanced position forwardly of the first retracted position adjacent the machine tool, and thence removing the machined workpiece from a portion of the machine tool to a second advanced position forward of said first advanced position, while concurrently supporting the unmachined workpiece, from the machine tool, thence interchanging the first and second advanced positions of the machined and unmachined workpieces adjacent the machine tool so that the unmachined workpiece is in the second advanced position, thence depositing the unmachined workpiece on the portion of the machine tool, and then transferring the machined workpiece rearwardly to the retract position and then depositing the machined workpiece at the load-unload station of the conveyor.

The present invention may more readily be understood by reference to the accompanying drawings, in which:

FIGS. 7-15 are schematic diagrams illustrating the successive positions of the unmachined workpiece load chucks and machined workpiece unload chucks during a complete machining cycle.

DESCRIPTION OF THE INVENTION

Figure 1:
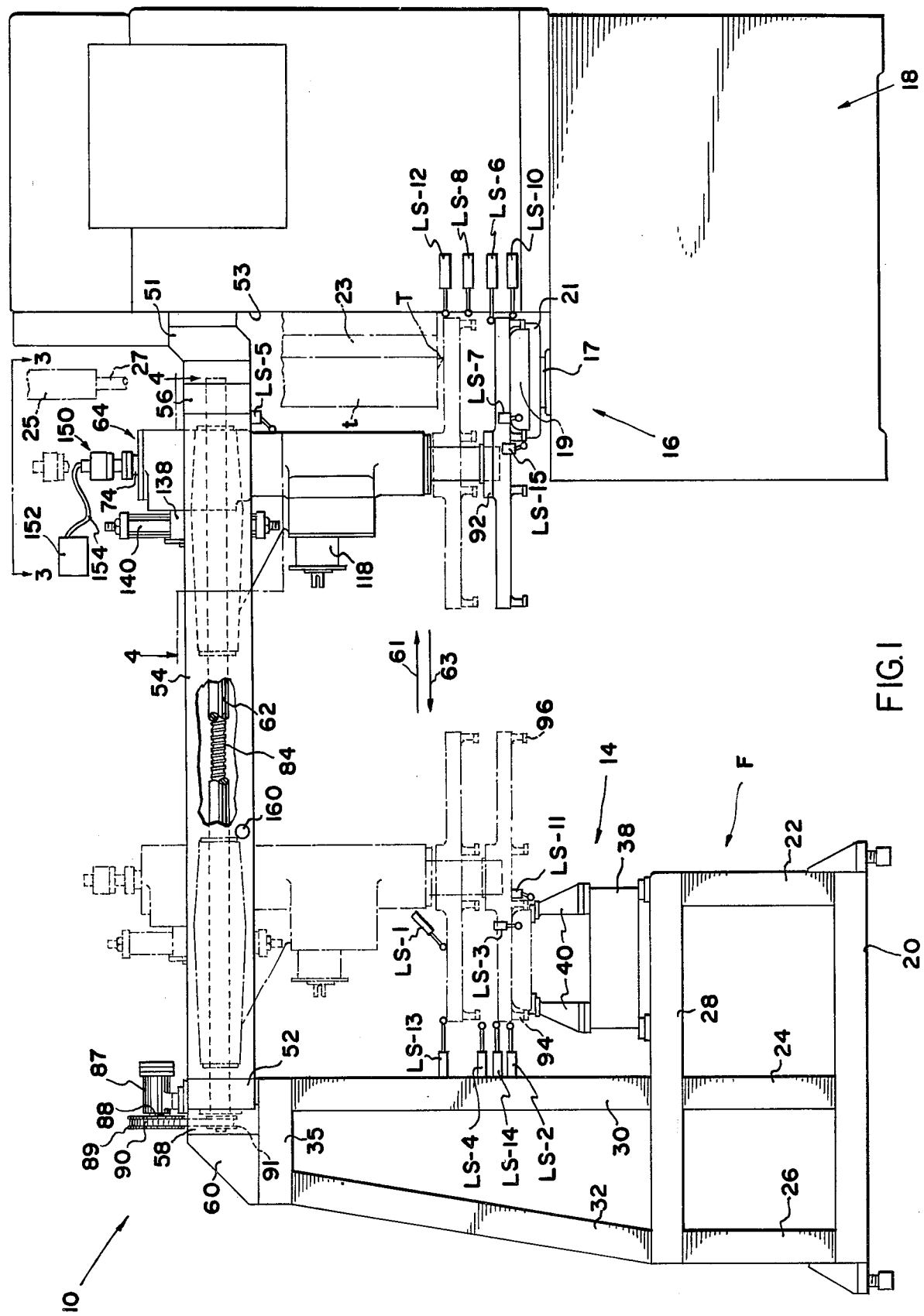
FIG. 1 is a side elevational view of apparatus constructed according to the present invention, parts of the frame being broken away to more clearly illustrate a carriage guide rod and drive screw.

Apparatus constructed according to the present invention, generally designated 10, is provided for transferring unmachined workpieces W from a load-unload station, generally designated 12, of a common supply-discharge conveyor, generally designated 14, to a machine tool station, generally designated 16, of a vertical spindle turning and boring machine, generally designated 18, and transferring machined workpieces W' from the machine tool station 16 to the load-unload station 12. The apparatus 10 includes a frame, generally designated F, including a base 20 comprising frame bars f spanned by frame bars 23. The base 20 mounts a plurality of upstanding posts 22, 24, and 26, spanned by a plurality of cross members 28. A plurality of vertical legs 30 and vertically inclined legs 32 are mounted atop the cross member 28 and are spanned at their upper ends by cross members 33 and 35.

The machine tool 18 includes a pair of vertical spindles 17 rotatably driven about parallel, vertical axes 19 and mounting a pair of workpiece receiving chucks 21. The machine 18 includes a slide 23 mounting a pair of tools T, such as boring or turning tools for reciprocal vertical movement. A hydraulically operated cylinder 25 is mounted on the machine 18 and includes a reciprocal piston 27 coupled to a toolholder T slidably mounted on the slide 23 for moving the tools T into and out of engagement with unmachined workpieces W mounted on the chucks 21 in a manner to be described. Fluid is supplied to the cylinder 25, in a manner to be described hereinafter, to move the piston 27 and tools T downwardly to a machining position after the workpiece transfer carriage, to be immediately described, has deposited the unmachined workpiece W on the chucks 21 and retracted.

THE CONVEYOR AND FRAME

The conveyor, generally designated 14, for supplying unmachined workpieces W and for discharging machined workpieces W', is mounted on the cross bars 28 of the frame F forwardly of the vertical legs 30. The conveyor 14 includes a base 38 mounting spaced apart conveyor rail support members 40 which, in turn, mount a pair of spaced apart continually driven conveyor chains 42, which support and move the workpieces W and W'. A pair of escapement stops 44 are mounted on the frame F and include pistons or plungers 46 which in the extended position, project into the path of the unmachined workpieces W and, in the retracted position, permit the unmachined workpieces W to proceed forwardly on the chains 42 to the load-unload station 12. When the plungers 46 are extended to block the passage of unmachined workpieces W, the chains 42 merely escape under the workpieces W. When the pistons 46 are withdrawn, the chains 42 support and carry the workpieces W to the load-unload station 12. A pair of vertically movable, frame mounted stops, generally designated 48, are provided at the load-unload station for interrupting, in the raised positions, forward movement of the workpieces W at the load-unload station. When the stops 48 are in the lowered positions, the conveyor chains 42 forwardly move the machined workpieces W' downstream from the load-unload station 12 in the direction of the arrow 50.

The frame F includes a cross member 52 spanning the vertical posts 30 which cantileverally mount longitudinally extending, side rails 54, spanned by an end member 56. Reinforcement plates 58 and gussets 60 are mounted on the cross members 54 to secure the cross member 52. Spanning the end members 52 and 56 are a pair of longitudinally extending guide rods 62, which slidingly, reciprocably mount a turntable mounting carriage, generally designated 64.

An adapter 51 couples the cross frame member 56 to the front surface 53 of the machine tool 18.

The adapter 51 locates the loader 10 and accurately positions it to insure that the loader 10 does not move relative to the machine tool 18. Different adapters 51 can be utilized to provide a proper interface of the loader-unloader 10 with the machine 18 without substantial modification of the loader-unloader 10 or the machine 18. The machine 18 will not be subjected to vibration during precision machining operations due to the fact that the loader system 10 is supported externally from the machine 18. The vibration is also reduced because of mechanical harmonic motion control, to be more particularly described hereinafter.

THE CARRIAGE AND TURNTABLE

The carriage 64 includes a sub-frame, generally designated 66, including a central housing member 68 mounted on a longitudinally extending sleeve 69, which are slidably, reciprocally mounted on the guide rods 62. The central housing 68 journals a vertical, hollow turntable mounting shaft 70 (FIG. 5) which includes a lower, enlarged diameter hollow shaft section 71, journalled in a dependent housing portion 73 by bearings 72 and an upper, reduced diameter shaft 74 received in a clearance opening 76 provided at the upper end 78 of the housing 68. The lower end 80 of the shaft 70 mounts a turntable, or carousel, generally designated 92.

Figure 3:
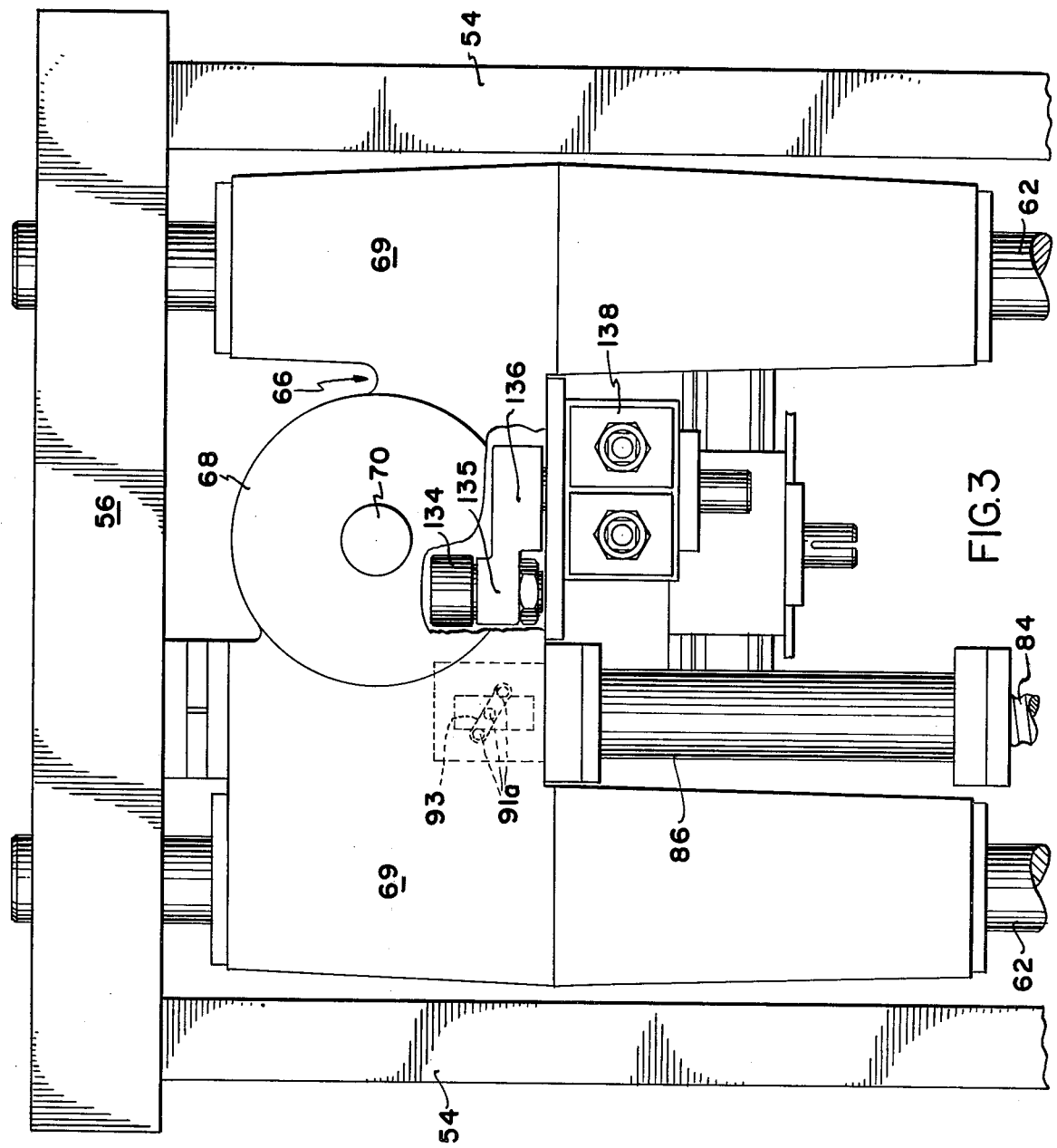
FIG. 3 is a top plan view of the loader-unloader carriage, taken along the line 3—3 of FIG. 1.

The carriage 64 is movable in forward and reverse paths of travel, represented by the arrow 61 and 63 via a ball screw and nut assembly, generally designated 82. The ball screw and nut assembly 82 includes a screw 84 journalled in bearings 85 provided on the end frame member 52 and a ball screw nut assembly 86 provided on the housing 68. The screw 84 is driven via a hydraulically driven motor 87, mounted on the cross frame 52, having a shaft 88 mounting a pulley 89. A drive belt or chain 90 is trained around the pulley 89 and a pulley 91 fixed to one end of the screw 84. A plurality of metal balls 91a (FIG. 3) are received in a track 93 on the ball nut assembly 86, as usual. When the motor 87 is driven in one direction, the carriage 64 is translated forwardly in the direction of the arrow 61, and when the motor 87 is driven in the opposite direction, the carriage is translated rearwardly in the direction of the arrow 63.

The carriage is moved between a retract position, generally designated 64a, and an advance or forward position, generally designated 64b. The turntable 92 includes a pair of unmachined workpiece, gripping, air operated chucks 94 and a pair of diametrically oppositely opposed machined workpiece air operated chucks 96. The chucks 94 are air operated to pick up unmachined workpieces W on the conveyor 14 and deposit them on the workpiece chucks 21, where the machined workpiece chucks 96 are operative to grip and hold a pair of mechanined workpieces W' on the chuck 21 and transfer them to the load and unload station 12 on the supply-discharge conveyor 14.

The chucks 94 and 96 may suitably comprise air operated chucks, such as the six inch piston, 3-jaw, air operated chucks manufactured by Bay City Boring Corp., Bay City, Mich. Harmonic motion producing apparatus, generally designated 95, is provided for rotating the carousel, or turntable, 92, so that the unmachined workpiece chucks 94 are selectively positioned in a first retract position 94a (FIGS. 1 and 8) and a second retract position 94b (FIG. 13) when the carriage is in the retract position 64a. The apparatus 95 will also rotate the carousel 92 to move the unmachined workpiece chuck 94 between a first advance position 94d (FIG. 9) and a second advance position 94c (FIG. 11) when the carriage is in the advanced position 64b.

Concurrent with the movement of the unmachined chucks 94 from the second retract position 94b to the first retract position 94a, the apparatus 95 for rotating the turntable 92 is also operative to move the machined workpiece chucks 96 between a first retract position, generally designated 96a (FIG. 13) in which the chucks 96a deposit machined parts W' on the conveyor 14 to a second retract position, generally designated 96b (FIG. 15) when the carriage is in the retract position 64a. The apparatus 95 is also operative when the carriage 64 is in the advanced position 64a for moving the machined workpiece chucks 96 from a second advanced position, generally designated 96c (FIG. 9) to a first advanced position, generally designated 96d (FIGS. 11 and 12) as the chucks 94 move from the first advance position 94d to the second advance position 94c.

Figure 4:
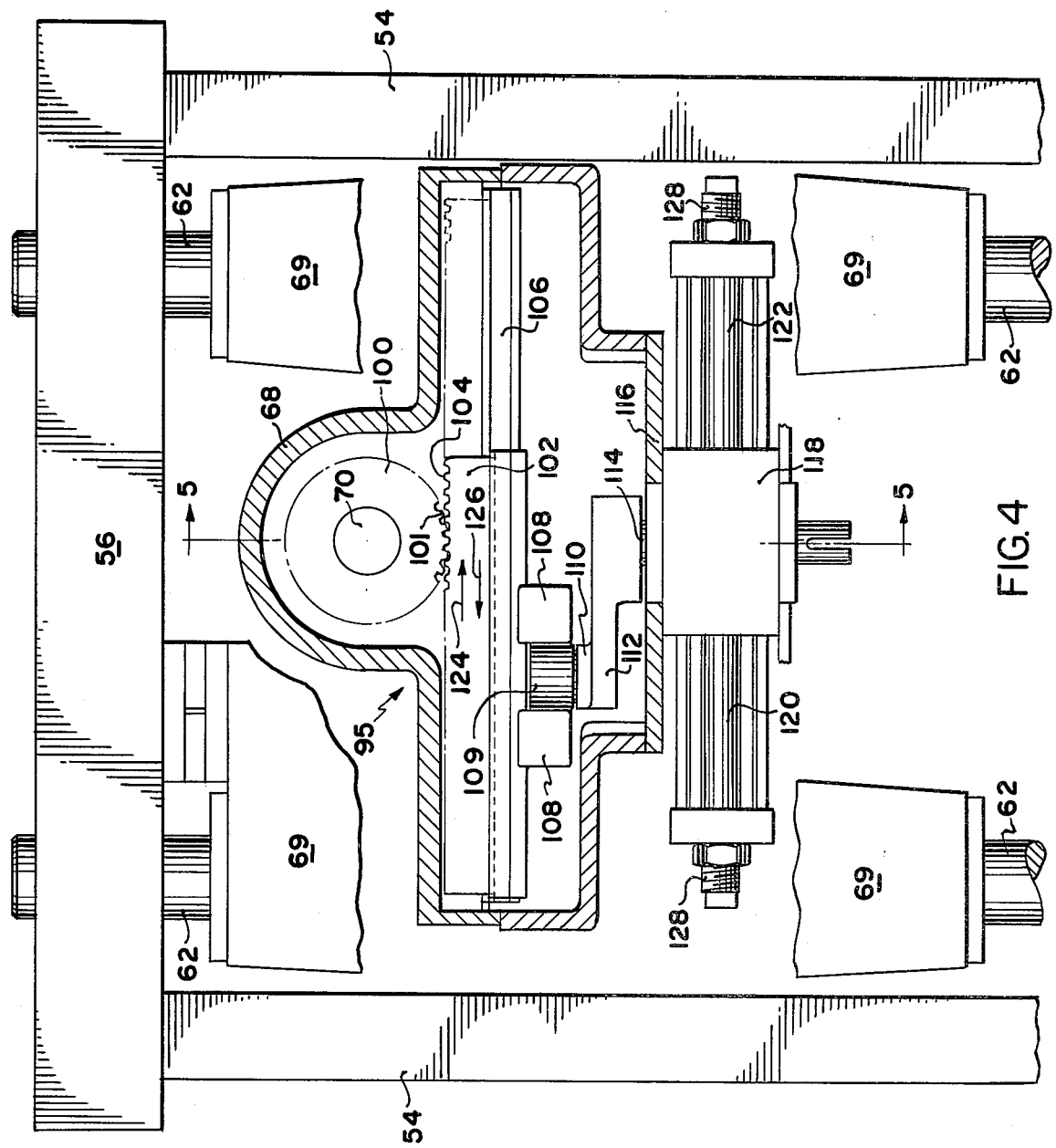
FIG. 4 is a top plan sectional view, taken along the line 4—4 of FIG. 1.

The turntable rotating apparatus 95 (FIG. 4) includes a gear, generally designated 100, mounted on the turntable shaft 70 and including a plurality of gear teeth 101. The gear 100 is driven by a rack, generally designated 102, which has a plurality of teeth 104 in meshing engagment with the gear teeth 101. The rack 102 is reciprocally slidably mounted in frame mounted guides 106 and includes arcuate cam guides 108 which receive a cam guide roller 109 journalled on the end 110 of a crank arm 112. The crank arm 112 is fixed to a shaft 114 which is journalled in a frame portion 116 of the housing 68 and is driven by a hydraulic actuator 118. The hydraulic actuator 118 is of the type manufactured by Ohio Oscillator, 1707 W. Main Street, Orrville, Ohio, under Model No. 37, Serial HA, and includes an internal rack and gear (not shown) driven in opposite directions by a pair of hydraulically operated cylinders, generally designated 120, 122. As the hydraulically operated cylinders are opposite and alternately driven in opposite directions, the hydraulic actuator unit 120 will cause the crank arm 112 to rotate through a 180° to-and-fro path of rotation. The guide roller 109 will cause the vertical cam track 108 and the rack 102 to reciprocate in a to-and-fro horizontal path of travel, represented by the arrows 124 and 126, to alternately and oppositely rotate the carousel, or turntable 92, in opposite directions through a 180° path of travel. The cylinders 120, 122, include adjustable stop screws 128 to adjust the stroke of the rack 102 to properly position of the turntable 92 so that the chucks 94 and 96 are accurately positioned above the workpiece receiving chucks 21 and the supply-discharge conveyor 14.

Figure 5:
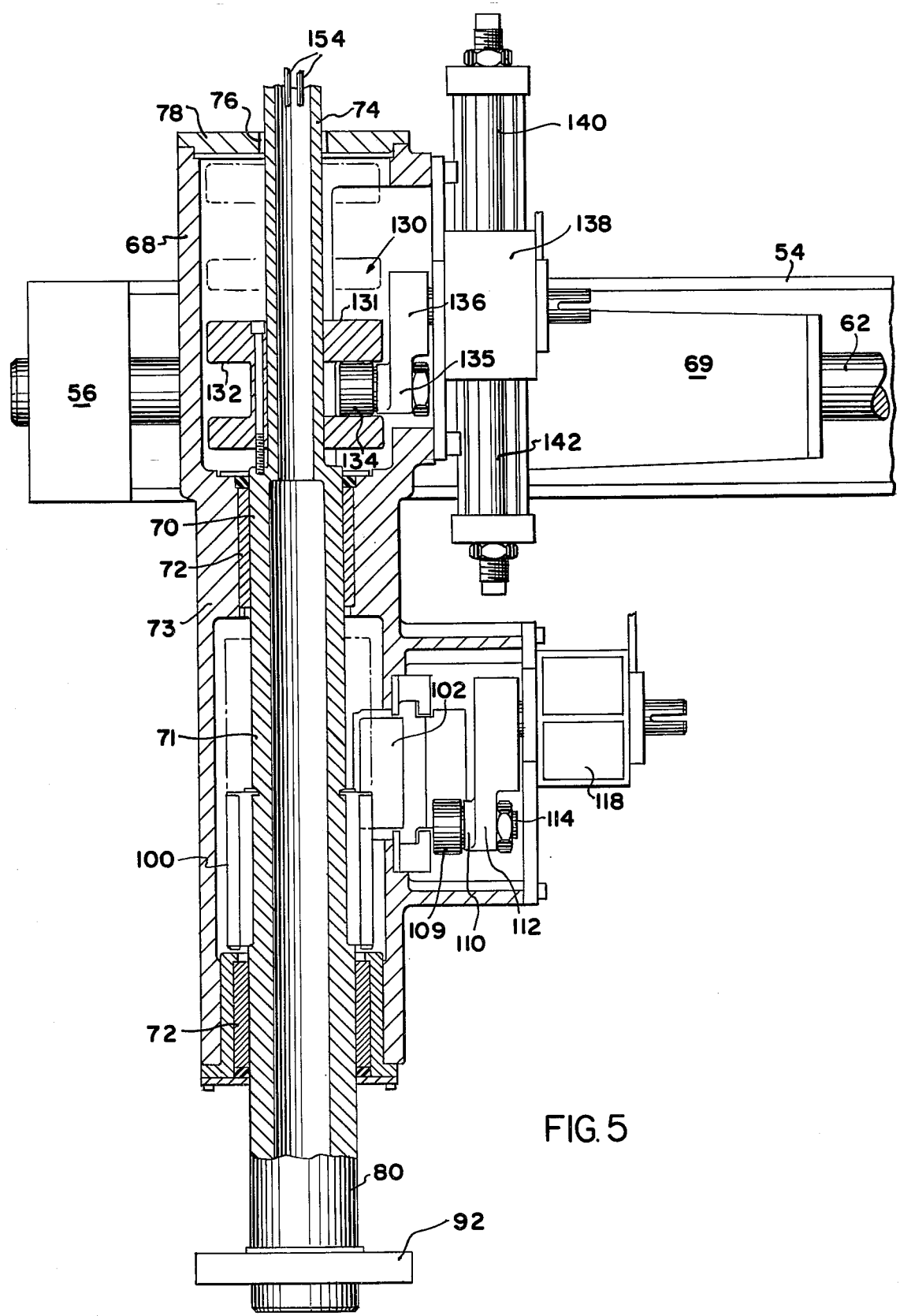
FIG. 5 is a sectional side view taken along the line 5—5 of FIG. 4.

The gear teeth 101 and rack teeth 104 are vertically splined so that the gear teeth 101 and 104 remain engaged while the gear teeth 101 can move vertically from the lowered position illustrated in solid lines in FIG. 5 to the raised position illustrated in chain lines in FIG. 5 in a manner to be immediately described.

Apparatus, generally designated 130 (FIG. 5), is provided for vertically moving the carousel, or turntable 92, from the lower position illustrated in solid lines in FIG. 5 to a raised position illustrated in chain lines in FIG. 5, and includes a slotted yoke, generally designated 131, fixed to the turntable mounting shaft 71. The turntable raising apparatus 130 includes a circumferential slot 132 which receives a follower roller 134 journalled on the end 135 of a crank arm, generally designated 136. The crank arm 136 is driven in a to-and-fro, 180°, arcuate path of travel via a hydraulic, rotary, OHIO type actuator 138, which is identical to the rotary actuator 118. The actuator 138 permits arcuate travel up to 190°.

The rotary actuator 138 is driven in a to-and-fro path of travel by a pair of cylinders 140 and 142, identical to the hydraulically operated cylinders 120 and 122. As the actuator 138 is operated, the cam follower roller 135 will move in an arcuate path of travel forcing the yoke 131 and the shaft 74 upwardly from the position illustrated in solid lines in FIG. 5 to the raised position illustrated in chain lines in FIG. 5. The yoke 131 thus travels with a harmonic motion having a relatively slow start and finish velocity and relatively fast intermediate velocity. An air rotary union, generally designated 150 (FIG. 1) is mounted atop the shaft 74 for coupling a pneumatic source 152 to hoses 154, internally received by the shaft 71. The hoses 154 are coupled to the air operated chucks 94 and 96 for operating the chucks.

In the event maintenance of the machine tool 18 is required, a safety bar 160 is insertable through apertures provided in the side frame members 54 to prevent inadvertent forward movement of the carriage 64 from the retracted position illustrated in chain lines at 64a in the advanced position illustrated in chain lines at 64b. Maintenance can be accomplished without moving or disassembling the frame F. During maintenance, workpieces W can continue to be manually supplied to the chucks 21. The apparatus 130 for vertically moving the turntable and the turntable rotating apparatus 95 provides a harmonic motion which has a slow acceleration and deceleration at the starting and terminal portions of the stroke, but yet has an extremely fast transfer motion during the midportion of the stroke. The harmonic motion also provides a relatively vibration-free operating cycle.

THE CONTROL CIRCUIT

Figure 6:
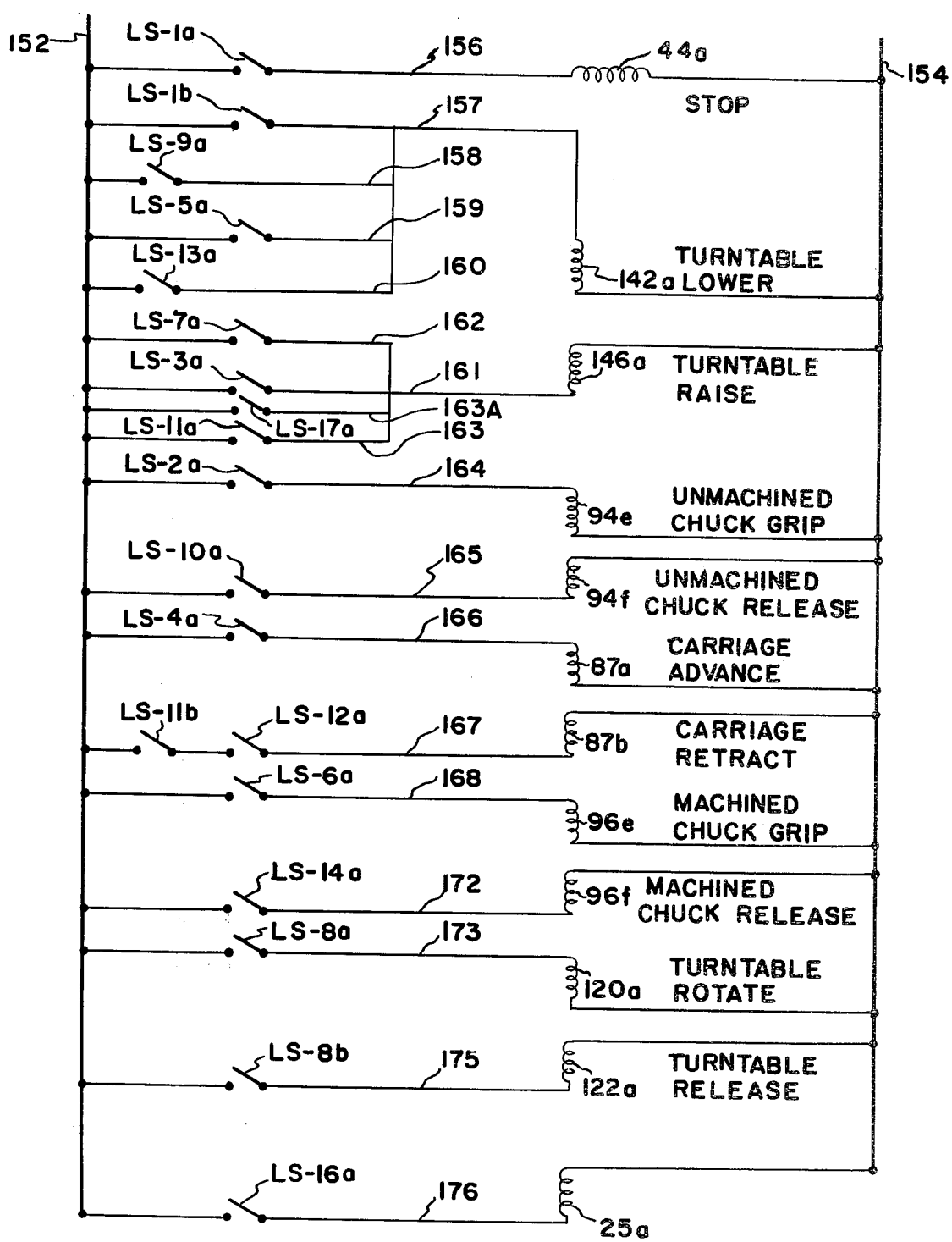
FIG. 6 is a schematic diagram of an electrical control circuit for controlling the apparatus illustrated in FIGS. 1-5.

Referring now more particularly to FIG. 6, a pair of lines 152 and 154 are connected across a suitable source of power such as 110 volt, 60 cycle, alternating current. Connected across the input circuit lines 152 and 154 are a plurality of circuit lines 156–180. Coupled across the lines 152 and 154 is a circuit line 156 including the normally open contacts LS-1a of the limit switch LS-1 which is tripped when the turntable 92 is in the raised retract position illustrated at the left side of FIG. 1 and identified by the reference character 64a, and the chucks 94 are positioned above the conveyor load-unload station 12. Also connected in series with the limit switch contacts LS-1a is a solenoid 44a for operating the stops 44 and 48 so that the stops 44 and 48 are concurrently retracted to permit machined workpieces W' at the load-unload station 12 to be released and permit the unmachined workpieces W to enter into the load-unload station 12.

Connected in line 157 is a set of normally open limit switch contacts LS-1b which are closed when the limit switch LS-1 is tripped. Also connected in line 157 is a solenoid 142a for actuating the turntable lowering cylinder 142 which will actuate the hydraulically operated cylinder 142 and cause the turntable mounting shaft 71 and turntable 92 to lower.

Connected in parallel with the limit switch contacts LS-1b is a circuit line 158 including a set of normally open limit switch contacts LS-9a which are closed when a limit switch LS-9 is tripped. The limit switch LS-9 is mounted on the frame and is tripped when the turntable 92 is moved to the advanced position in which the unmachined workpiece chucks 94 are in the second advance position 94c (FIGS. 11 and 12) above the workpiece spindles 17. Coupled in parallel with the limit switch contacts LS-1b is a circuit line 159 including a set of normally open contacts LS-5a which close when a limit switch LS-5 is tripped. The limit switch LS-5 is mounted on the side frame members 54 and is tripped when the carriage 64 is initially moved to the advanced position illustrated in chain lines of 64b and the unmachined workpiece chucks 94 are in the second advance position 94c (FIG. 11) over the spindles 17. Also coupled in parallel with the limit switch contacts LS-1b is a circuit line 160 including a set of normally open contacts LS-13a which close when a limit switch LS-13 is tripped. The limit switch LS-13 is mounted on the frame F and is tripped when the carriage 64 is in the retract position illustrated at chain lines of 64a and the turntable 92 has been moved to the raised position after machined workpieces W' have been deposited at the load-unload station 12.

Connected in line 161 is a set of normally open limit switch contacts LS-3a which are closed when the limit switch LS-3 is tripped. The limit switch LS-3 is mounted on the turntable 92 in the path of the unmachined workpiece chucks 94 so as to be actuated thereby when the unmachined workpiece chucks 94 grip unmachined workpiece W at the load-unload station 12. Also connected in series with the normally open limit switch contacts LS-3a is a turntable raise cylinder 146a (line 161) which is operable to actuate the cylinder 146 to drive the follower roller 134 and raise the shaft 71 of the turntable to the position illustrated in chain lines in FIG. 5.

Coupled in parallel with the limit switch contacts LS-3a are circuit lines 162, 163, and 163A. Connected in line 162 is a set of normally open limit switch contacts LS-7a which close when a limit switch LS-7 is tripped. The limit switch LS-7 is mounted on the turntable 92 and is actuated when the machined workpiece chucks 96 grip a machined workpiece W' positioned on the machine chucks 21.

A set of normally open limit switch contacts LS-11a is connected in line 163 and is closed when a limit switch LS-11 is tripped. The limit switch LS-11 is mounted on the turntable 92 and is tripped when the machined workpiece chucks 96 deposit a machined workpiece W' at the load-unload station 12. Line 163A includes a set of contacts LS-17a which close when a limit switch LS-17 is tripped by the chucks 96 after they deposit machined workpieces on the conveyor 14.

Connected in line 164 is a set of normally open limit switch contacts LS-2a which close when the limit switch LS-2 is actuated. The limit switch LS-2 is mounted on the vertical frame member 30 atop the turntable 92 so as to be tripped thereby when the turntable is in the lowermost retract position illustrated at the left side in FIG. 1. Also connected in circuit line 164 is a solenoid 94e for operating suitable valves (not shown) for closing the unmachined workpiece chucks 94, to grip unmachined workpieces W at the load-unload station 12.

Connected in line 165 is a set of normally open limit switch contacts LS-10a which close when a limit switch LS-10 is tripped. The limit switch LS-10 is mounted in the path of the turntable 92 when the carriage 64 is in the forward, advanced position illustrated in chain lines at 64b and the unmachined workpiece chucks 94 are in the second advanced position illustrated at 94c. Connected in series with limit switch contacts LS-10a is an unmachined workpiece chuck release solenoid 94f which when energized, opens the unmachined workpiece chucks 94 to concurrently release a pair of unmachined workpieces to the machine chuck 21.

Connected in the series in line 166 is a set of normally open limit switch contacts LS-4a which close when a limit switch LS-4 is tripped. The limit switch LS-4 is mounted on the vertical frame post 30 and is in the path of the turntable 92, as the carriage 64 is in the retracted position and the unmachined workpiece chucks 94 are raised to the first retracted position 94a after the unmachined workpieces have been removed from the load-unload station 12. Also connected in series with the limit switch contacts LS-4a is a solenoid 87a for actuating a hydraulic valve which directs fluid to the hydraulic motor 87 to turn the screw 84 and advance the carriage forwardly in the direction of the arrow 61.

Figure 2:
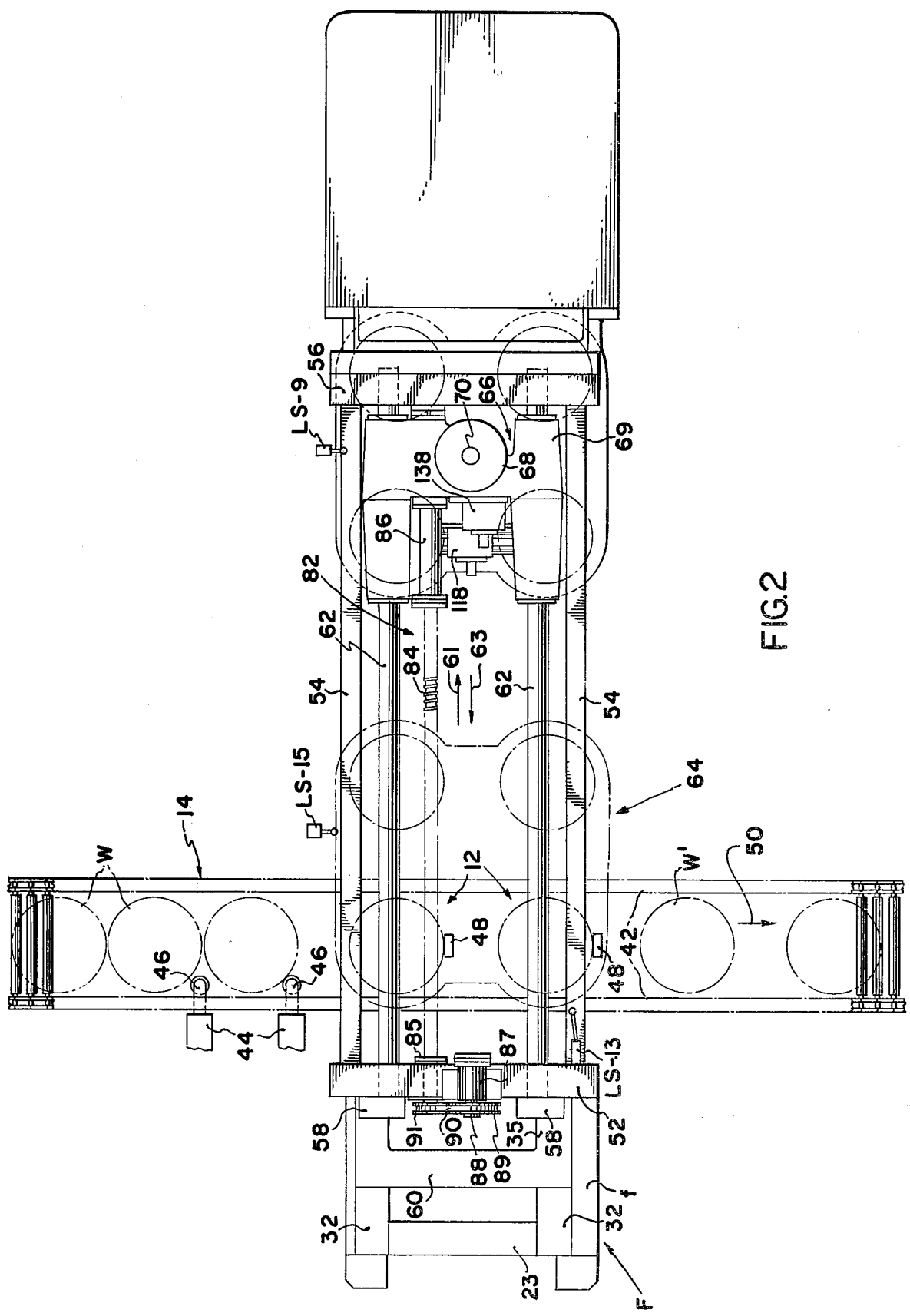
FIG. 2 is a top plan view thereof, schematically illustrating the loader-unloader carriage and turntable in the various advance and retract positions.

Connected in line 167 is a set of normally open limit switch contacts LS-11b and a set of normally open limit switch contacts LS-12a which close when the limit switches LS-11 and LS-12 respectively, are tripped. The limit switch contacts LS-12a are closed when the limit switch LS-12 mounted on the machine 18, is tripped as the carriage 64 is in the advanced position 64b, and the unmachined workpiece chucks 94 are in the second advanced, raised position 94c after the unmachined workpiece chucks 94 have been raised to the position illustrated in FIG. 12 after depositing unmachined workpieces W on the machine spindles 17. Connected in series with the limit switch contacts LS-11b and LS-12a is a solenoid 87b for directing fluid to the motor 87 in an opposite direction to turn the ball screw 84 oppositely so that the carriage 64 is retracted in the direction of the arrows 63 (FIG. 2).

Connected in line 168 is a set of normally open limit switch contacts LS-6a which are closed when the limit switch LS-6 is tripped. The limit switch LS-6, mounted on the machine 18, is tripped when the carriage 64 is in the advanced position 64b, and the machined workpiece chucks 96 are in the second advanced position 96c and the turntable 92 is in the lowermost position for gripping the machined workpieces W'.

Connected in line 172 are the normally open limit switch contacts LS-14a which close when the limit switch LS-14 is actuated. The limit switch LS-14 is mounted on the upstanding vertical frame member 30 and is tripped when the carriage 64 is in the retract position 64a and the machined workpiece chucks 96 are disposed over the conveyor 14 in the lowermost position illustrated in chain lines in FIG. 1. Connected in series with the limit switch contacts LS-14a is the machined chuck release solenoid 96f which when energized, opens the machined workpiece chucks 96 to concurrently release a pair of machined workpieces at the load-unload station 12.

Connected in line 173 is a set of normally open limit switch contacts LS-8a which are closed when a limit switch LS-8 mounted on the machine 18, is tripped. The limit switch LS-8 is tripped when the carriage 64 is in the advanced position 64b and when the machined workpiece chucks 96 have removed machined workpieces W' from the machine chuck 21 to the raised, second advance position 96c illustrated in FIG. 11. Connected in series with the limit switch contacts LS-8a is a solenoid 120a for controlling a valve which directs hydraulic fluid to the turntable rotate cylinder 120. Connected in line 175 is a set of normally open contacts LS-15a which close when the limit switch LS-15 is actuated. The limit switch LS-15 is mounted on the turntable and is tripped when the carriage 64 is in the retract position 64a and the machined workpiece chucks 96 are in the first retract position 96a and have released the machined workpieces W' on the conveyor 14 and the turntable 92 has been retracted to the raised position illustrated in solid lines in FIG. 14. Also connected in line 175 is a solenoid 122a which directs fluid to the cylinder 122, causing the turntable to rotatably return in the opposite direction to the starting position.

Connected in line 176 is a set of normally open limit switch contacts LS-16 which close when the limit switch is actuated by the carriage departing the position 64b. Connected in series in line 176 with contacts LS-16a is a solenoid 25a which when energized will direct fluid to cylinder 25 to cause the tool T to be lowered to a machining position.

THE OPERATION

In operation, unmachined workpieces W are supplied on the conveyor chains 42. The carriage 64 will be assumed to be in the retract position illustrated in chain lines 64a, causing the limit switch contacts LS-1a (line 156) to close whereby the solenoid 44a is energized and the stops 44 and 48 are withdrawn. The workpieces W will be carried by chains 42 into the load-unload station 12 and any previously deposited machined workpieces W' will be concurrently carried downstream. When the limit switch LS-1 is tripped, the contacts LS-1b (line 175) will close, energizing the turntable lowering solenoid 142a, causing the turntable 92 to lower from the raised position illustrated in chain lines (FIG. 7) to the lowermost position illustrated in chain lines in FIG. 1 and in solid lines in FIG. 7. When the turntable 92 reaches the lowermost position illustrated in chain lines in FIG. 1 and in solid lines in FIG. 7, the limit switch LS-2 will be actuated causing the contacts LS-2a (line 164) to close, thereby actuating the solenoid 94e. This will actuate the unmachined workpiece chucks 94 to grip a pair of unmachined workpieces W at the load station. When the unmachined workpiece chucks 94 grip the workpieces W, the limit switch LS-3 is actuated to close the contacts LS-3a (line 161) and energize the turntable raise solenoid 146a (line 161) causing the turntable 92 to be returned to the raised position illustrated in solid lines in FIG. 8. When the turntable 92 reaches the uppermost position, the limit switch LS-4 will be actuated to close the contacts LS-4a (line 166) and energize the carriage advance solenoid 87a. This will direct fluid to the motor 87 advancing the carriage in the direction of the arrow 61 to the advanced position, illustrated at 64b.

When the carriage 64 reaches the end of its forward travel, the limit switch LS-5 is actuated causing the limit switch contacts LS-5a (line 159) to be closed, thereby re-energizing the turntable lowering solenoid 142a to lower the turntable 92. At this time, the machined workpiece chucks 96 will be in the second advanced position 96c above the spindles 17 as shown in FIG. 9. When the turntable 92 reaches its lowermost position illustrated in solid lines in FIGS. 1 and 9, the limit switch LS-6 will be tripped to close the contacts LS-6a (line 168) thereby energizing the machined workpiece chuck gripping solenoid 96e (line 168) and causing the machined workpiece chucks 96 to grip the previously machined workpieces W' held by the machine chucks 21.

As the machined workpiece chucks 96 grip the previously machined workpieces W', the limit switch LS-7 is tripped to close a normally open set of contacts LS-7a (line 160) energizing the turntable raise solenoid 146a thereby raising the turntable 92 to the raised advanced position illustrated in chain lines at the right side of FIG. 1 and solid lines in FIG. 10.

When the turntable 92 reaches its upward limit of travel, the limit switch LS-8 will be actuated closing the contacts LS-8a (line 173) thereby energizing the turntable rotate solenoid 120a and causing the turntable 92 to rotate through 180°. When the cylinder 120 is actuated, the cam follower roller 108 will move the rack 102 causing the turntable to move through 180°. When the turntable has been rotated through 180°, the limit switch LS-9 will be actuated to close the contacts LS-9a (line 158) thereby energizing the turntable lowering solenoid 14a (line 157) to once again lower the turntable 92 to the lowermost position illustrated in solid lines in FIG. 1 and solid lines in FIG. 11.

When the turntable once again reaches its lowermost position, the limit switch LS-10 is actuated to close the normally open limit switch contacts LS-10a (line 165) and energize the unmachined workpiece chuck release solenoid 94f causing the unmachined workpiece chucks 94 to release the unmachined workpieces W on the machine tool chucks 21. The limit switch LS-11 will then be actuated to close the contacts LS-11a (line 163) and energize the turntable raise cylinder 146a (line 161), thereby raising the turntable 92 to the raised position illustrated in chain lines at the right side of FIG. 1 and in solid lines in FIG. 12. The limit switch LS-12 will then be energized, closing the normally open contacts LS-12a (line 167). The normally open limit switch contacts LS-11b (line 167) will also be closed and the carriage retract solenoid 87b will be energized to direct fluid to the motor 87 causing the screw 84 to be turned in the opposite direction thereby directing the carriage 64 in the return direction represented by the arrow 63. As soon as the carriage 64 leaves the work station, the limit switch contacts LS-16a will close to energize a solenoid 25a (line 176) will be actuated to direct fluid to cylinder 25 and cause the tools T to be lowered to a machining position so that the unmachined workpieces W will be machined.

When the carriage 64 reaches its retract position 64a the machined workpiece chucks 96 will be in the first retract position 96a immediately above the conveyor (see FIG. 13). The normally open limit switch contacts LS-13a (line 160) will be closed and the turntable lowering cylinder 142a will once again be energized to lower the turntable 92. When the turntable 92 reaches the lowermost position (solid lines—FIG. 13), the limit switch LS-14 will be tripped to close a set of normally open limit switch contacts LS-14a (line 172) whereby the machined workpiece chuck release solenoid 96f is energized to release the machined workpieces W' onto the load-unload station 12 of the conveyor 14. As the chucks 96 open, limit switch LS-17 is tripped to close contacts LS-17a (line 163A) and once again energize the turntable raise solenoid to raise the turntable to the raised, retract position. The opening of the unmachined workpiece chucks 96 and raising of the turntable 92 will actuate the limit switch LS-15 closing the contacts LS-15a (line 174) thereby energizing the turntable rotate cylinder 120a (line 173) whereby the turntable 92 will once again be rotated 180° so that the unmachined chucks 94 will be moved from the second retract position 94b to the first retract position 94a immediately above the conveyor 14. The sequence of operation will then be repeated.

It is understood that the drawings and descriptive matters are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Loading and unloading apparatus for loading and unloading a machine tool comprising:

a frame;

a supply-discharge conveyor for supplying unmachined workpieces to a load-unload station and for receiving machined workpieces from said load-unload station; and transfer means on said frame for transferring unmachined workpieces from said conveyor to said machine tool and for transferring machined workpieces from said machine tool to said conveyor at said load-unload station;

said transfer means including:

unmachined workpiece chuck means for gripping and holding unmachined workpieces on said conveyor, and removing an unmachined workpieces from said conveyor at said load-unload station to a first retracted position;

means for bodily forwardly transferring said unmachined workpiece chuck means and the unmachined workpiece held thereby from said first retract position to a first advanced position forwardly of said retracted position which is remote from said conveyor and adjacent such a machine tool;

machined workpiece chuck means for gripping and holding machined workpieces on a portion of such a machine tool and removing a machined workpiece from said portion of such a machine tool and transferring it to a second advanced position forward of said first advanced position;

means for interchanging the first and second advanced positions of said machined and unmachined workpiece chuck means adjacent said machine tool so that said unmachined workpiece chuck means and said unmachined workpiece held thereby is in said second advance position and said machined workpiece chuck means and said machined workpiece held thereby is moved to said first advance position;

means for operating said unmachined workpiece chuck means to deposit said unmachined workpiece on said portion of sad machine tool;

means for bodily rearwardly transferring said machined workpiece chuck means to said retracted position; and means for operating said machined workpiece chuck means to release said machined workpiece for deposit on said conveyor.

2. The loading and unloading apparatus set forth in claim 1 where said transfer means includes carriage means movable in a to-and-fro forward and reverse path of travel and turntable means mounted on said carriage means for movement therewith and for rotating movement relative thereto as well as vertical movement relative thereto; said turntable means mounting said unmachined workpiece chuck means and said machined workpiece chuck means.

3. The loading and unloading apparatus set forth in claim 1 wherein said transfer means includes: carriage means forwardly and rearwardly movable in a to-and-fro path of travel between a rearward position adjacent said conveyor and a forward position adjacent said machine tool; turntable means, mounted on said carriage means for movement therewith and for rotating movement thereon about a vertical axis; said turntable means mounting said unmachined workpiece chuck means for vertical movement relative to said carriage means between raised and lowered positions, to grip unmachined workpieces on said conveyor at said load-unload station and release gripped unmachined workpieces to a portion of said machine tool, said turntable means mounting said machined workpiece chuck means, for vertical movement relative to said carriage means between raised and lowered positions to grip machined workpieces on said portion of said machine and release machined workpieces to said conveyor at said load-unload station; means for moving said turntable means and said unmachined workpiece chuck means from a first raised, retract position to said lowered position when said carriage means is in said rearward position; means for operating said unmachined workpiece chuck means to grip and hold on unmachined workpiece on said conveyor; means for raising said unmachined workpiece chuck means and the unmachined workpiece held thereby to said raised position; means for moving said carriage means and said turntable means forwardly to said forward position to move said unmachined workpiece chuck means and said unmachined workpiece to a first advance position while concurrently moving said machined workpiece chuck means to a second advance position; means for lowering said machined workpiece chuck means from said raised position to said lowered position while said carriage means is in said forward position; means for operating said machined workpiece chuck means to grip and hold a machined workpiece on a portion of said machine tool; means for returning said machined workpiece chuck means and said machined workpiece held thereby to said raised position; means for rotating said turntable means about said vertical axis to move said machined workpiece chuck means and machined workpiece held thereby to said first advanced position and concurrently move said unmachined workpiece chuck means and the unmachined workpiece held thereby to said second advance position; means for lowering said unmachined workpiece chuck means to said lower position; means for operating said unmachined workpiece chuck means in said lowered position to release the unmachined workpiece to said portion of said machine; means for returning said unmachined workpiece chuck means to said raised, second advance position; means for returning said carriage means to said rearward position in which said machined workpiece chuck means, and the machined workpiece held thereby, is in said first raised, retract position and said unmachined workpiece chuck means is in a second retract position forwardly of said first retract position; means for lowering said machined chuck means and the machined workpiece held thereby to said lowered position adjacent said conveyor; means for operating said machined workpiece chuck means to release said machined workpiece carried thereby to said conveyor; means for returning said machined workpiece chuck means to said raised position; and means for rotating said turntable means to move said unmachined workpiece chuck means to said first raised retract position while concurrently moving said machined workpiece chuck means to said second retract position.

4. The loading and unloading apparatus set forth in claim 3 wherein said unmachined workpiece chuck means, said machined workpiece chuck means, and said turntable means are coupled together for concurrent vertical movement between said raised and lowered positions.

5. Apparatus for loading and unloading workpieces to and from, respectively, a machine tool comprising:
   transfer means for removing at least one unmachined workpiece from a supply-discharge conveyor and moving it upwardly and forwardly to an advance position which is remote from said conveyor and ajdacent said machine tool;
   said transfer means including means for thereafter removing machined workpieces from said machine tool while concurrently supporting said unmachined workpiece;
   said transfer means including means for thereafter moving said unmachined workpiece forwardly and concurrently moving said machined workpiece rearwardly; means for moving said unmachined workpiece downwardly, and depositing said unmachined workpiece on said machine tool while concurrently supporting said machined workpiece;
   said transfer means including means for thereafter moving said machined workpiece upwardly, thence rearwardly, and thence downwardly and depositing said machined workpiece on said supply-discharge conveyor.

6. Workpiece loader and unloader apparatus for transferring unmachined workpieces from a common supply and discharge conveyor to a machine tool and for transferring machined workpieces from said machine tool to said common supply and discharge conveyor comprising:
   a frame;
   carriage means mounted on said frame for to-and-fro movement between a retract position adjacent said supply and discharge conveyor and an advance position which is remote from said conveyor and adjacent said machine tool;
   turntable means, including unmachined workpiece chuck means and machined workpiece chuck means mounted on said carriage for movement therewith and for rotating and vertical movement relative thereto;
   means for rotating said turntable means on said carriage means about a vertical axis through a 180° path of travel to selectively dispose said machined workpiece chuck means and said unmachined workpiece chuck means in positions overlying a portion of said machine tool and a portion of said conveyor when said carriage is in said advance position and said retract position respectively;
   means for upwardly and downwardly moving said turntable means, said unmachined workpiece chuck means, and said machined workpiece chuck means on said carriage means between raised and lowered positions;
   means for moving said carriage means in said to-and-fro path when said turntable means is in said raised position; and
   means for operating said unmachined workpiece chuck means to grip unmachined workpieces on said conveyor when said carriage means is in said retract position and said turntable means is in said lowered position and for discharging said unmachined workpieces on said portion of said machine tool when said carriage means is in said advance position and said turntable means is in said lowered position.

7. The workpiece loader and unloader apparatus set forth in claim 6 wherein said means for rotating said turntable means includes harmonic motion producing means for rotating said turntable at a predetermined velocity during an intermediate portion of rotation and for accelerating and decelerating rotation of said turntable means during start and finish portions of said rotation to rotate said turntable at a lesser predetermined velocity during the initial and terminal portions of rotation.

8. The workpiece loader and unloader apparatus wherein said motion producing means includes reciprocable crank means, cooperating cam means, and cam follower means on said crank means and said turntable means.

9. The workpiece loader and unloader apparatus set forth in claim 7 wherein said means for upwardly and downwardly moving said turntable means includes second harmonic motion producing means for vertically accelerating and decelerating movement of said turntable means at the start and terminal portions of said vertical movement to vertically move said turntable at a predetermined velocity during the midportion of said vertical movement substantially greater than the velocity at the start and terminal portion of said vertical movement.

10. Apparatus for loading and unloading machines, such as a vertical spindle boring machine, comprising:
   means, including unmachined workpiece chuck means, for removing an unmachined workpiece from a supply-discharge conveyor and advancing it forwardly from a first retract position adjacent said conveyor, to a first advance position which is remote from said conveyor and adjacent said machine;
   means, including machined workpiece chuck means, for removing a machined workpiece from a portion of said machine, while said unmachined workpiece is concurrently supported by said unmachined chuck means, and moving said machined workpiece chuck means and said machined workpiece held thereby to a second advance position forwardly of said first advance position;
   means for interchanging the relative positions of said unmachined workpiece chuck means and said machined workpiece chuck means to move said unmachined workpiece chuck means to said first advance position and concurrently move said machined workpiece chuck means to said second advance position;

means for operating said unmachined workpiece chuck means to deposit said unmachined workpiece on said portion of said machine; and means for retracting said machined workpiece chuck means to said first advance position and depositing said machined workpiece on said supply-discharge conveyor.

11. A method of loading and unloading a machine, such as a vertical spindle boring machine, comprising the steps of:

removing an unmachined workpiece from a supply-discharge conveyor and advancing it forwardly from a first retract position adjacent said conveyor to a first advance position which is remote from said conveyor and adjacent said machine;

moving a machined workpiece from a portion of said machine while concurrently supporting said unmachined workpiece and moving said machined workpiece to a second advance position forwardly of said first advance position;

interchanging the relative positions of said unmachined workpiece and said machined workpiece so that said machined workpiece is in said first advance position and said unmachined workpiece is in said second advance position;

depositing said unmachined workpiece on said portion of said machine tool;

retracting said machined workpiece to a first retract position and depositing said machined workpiece on said supply-discharge conveyor.

12. The method set forth in claim 11 wherein said steps of removing and depositing said unmachined workpiece and said machined workpiece are accomplished with a turntable mounting opposed unmachined workpiece chuck means and machined workpiece chuck means respectively;

said interchanging step being accomplished by interchanging the relative positions of said unmachined workpiece chuck means and said machined workpiece chuck means;

said step of retracting being accomplished by moving said machined workpiece chuck means to said first retract position and concurrently moving said unmachined workpiece chuck means to a second retract position forward of said first retract position;

and including the step of thereafter interchanging the relative positions of said machined workpiece chuck means and said unmachined workpiece chuck means so that said unmachined workpiece chuck means is in said first retract position and said unmachined workpiece chuck means is in said second retract position.

13. The method set forth in claim 11 wherein said step of removing said unmachined workpiece is accomplished by moving said unmachined workpiece chuck means from said first retract position downwardly, gripping the unmachined workpiece with said unmachined workpiece chuck means and then moving said unmachined workpiece upwardly to said first retract position;

said step of removing said machined workpiece from said portion of said machine is accomplished by moving said machined workpiece chuck means downwardly from said second advance position to a lowered position adjacent said portion of said machine, gripping said machined workpiece with said machined workpiece chuck means, and then moving said machined workpiece chuck means to said second advance position.

14. The method set forth in claim 12 wherein said unmachined workpiece chuck means is concurrently moved to a lowered position when said machined workpiece chuck means is moved to said lowered position.

15. A method of loading and unloading workpieces to and from respectively, a machine tool such as a vertical spindle boring machine, comprising the steps of:

supplying unmachined workpieces to a load-unload station;

removing an unmachined workpiece from said load-unload station to a first retract position adjacent said conveyor and then forwardly transfering said unmachined workpieces to a first advance position which is remote from said conveyor and adjacent said machine tool;

removing a machined workpiece from a portion of said machine tool to a second advance position forward of said first advance position;

interchanging the relative positions of said machined workpiece and said unmachined workpiece by moving said machined workpiece to said first advance position and said unmachined workpiece to said second advance position;

depositing said unmachined workpiece on said portion of said machine tool; and transferring said machined workpiece rearwardly and depositing said machined workpiece at said load-unload station.

* * * * *